(12) United States Patent
Forster

(10) Patent No.: US 7,701,352 B2
(45) Date of Patent: Apr. 20, 2010

(54) RFID LABEL WITH RELEASE LINER WINDOW, AND METHOD OF MAKING

(75) Inventor: Ian J. Forster, Essex (GB)

(73) Assignee: Avery Dennison Corporation, Pasadena, CA (US)

( * ) Notice: Subject to any disclaimer, the term of this patent is extended or adjusted under 35 U.S.C. 154(b) by 733 days.

(21) Appl. No.: 11/603,889

(22) Filed: Nov. 22, 2006

(65) Prior Publication Data

US 2008/0117056 A1　　May 22, 2008

(51) Int. Cl.
G08B 13/14　　(2006.01)
H01L 21/00　　(2006.01)

(52) U.S. Cl. .................. 340/572.8; 340/572.7; 438/108

(58) Field of Classification Search ... 340/572.1–572.9; 438/107–109, 118, 119
See application file for complete search history.

(56) References Cited

U.S. PATENT DOCUMENTS

| | | | |
|---|---|---|---|
| 5,315,753 A | 5/1994 | Jensen et al. | |
| 5,528,222 A | 6/1996 | Moskowitz et al. | |
| 5,598,032 A | 1/1997 | Fidalgo | |
| 5,654,693 A | 8/1997 | Cocita | |
| 5,867,102 A | 2/1999 | Souder et al. | |
| 5,950,304 A | 9/1999 | Khandros et al. | |
| 5,955,949 A | 9/1999 | Cocita | |
| 5,999,409 A | 12/1999 | Ando et al. | |
| 6,036,099 A | 3/2000 | Leighton | |
| 6,163,260 A * | 12/2000 | Conwell et al. | 340/572.8 |
| 6,259,408 B1 | 7/2001 | Brady et al. | |
| 6,262,692 B1 | 7/2001 | Babb | |
| 6,265,977 B1 | 7/2001 | Vega et al. | |
| 6,343,019 B1 | 1/2002 | Jiang et al. | |
| 6,390,375 B2 | 5/2002 | Kayanakis | |
| 6,429,831 B2 | 8/2002 | Babb | |
| 6,437,985 B1 | 8/2002 | Blanc et al. | |
| 6,460,245 B1 | 10/2002 | DiStefano | |
| 6,497,371 B2 | 12/2002 | Kayanakis et al. | |
| 6,512,302 B2 | 1/2003 | Mess et al. | |
| 6,522,308 B1 | 2/2003 | Mathjeu | |

(Continued)

FOREIGN PATENT DOCUMENTS

JP　　　8052968　　　2/1996

(Continued)

OTHER PUBLICATIONS

International Search Report from corresponding International Application No. PCT/US07/75961.

(Continued)

*Primary Examiner*—Jennifer Mehmood

(57) ABSTRACT

An RFID label includes a release liner having an opening or window, to allow placement of an interposer through the window, and in contact with end portions of an antenna. By coupling the interposer to the antenna through the window in the release liner, the coupling may be performed at a later point than usual in the fabrication of the label. This allows the label to be fabricated with less wear and tear on the interposer, which is a relatively expensive and fragile part of the antenna. In addition, testing of the interposers before applying them to a web of labels may save costs by eliminating waste of material. Testing of the straps alone can allow prediction of performance of the finished label.

23 Claims, 4 Drawing Sheets

U.S. PATENT DOCUMENTS

| | | | |
|---|---|---|---|
| 6,546,620 B1 | 4/2003 | Juskey et al. | |
| 6,575,374 B1 | 6/2003 | Boyadjian et al. | |
| 6,684,503 B1 | 2/2004 | Silverbrook et al. | |
| 6,687,986 B2 | 2/2004 | White | |
| 6,770,509 B2 | 8/2004 | Halope et al. | |
| 6,786,419 B2 | 9/2004 | Kayanakis | |
| 6,815,712 B1 * | 11/2004 | Kline | 257/48 |
| 6,851,617 B2 | 2/2005 | Saint et al. | |
| 6,851,618 B2 | 2/2005 | Halope | |
| 6,888,509 B2 | 5/2005 | Atherton | |
| 6,891,110 B1 | 5/2005 | Pennaz et al. | |
| 6,908,786 B2 | 6/2005 | Halope | |
| 6,937,153 B2 * | 8/2005 | Redlin | 340/572.8 |
| 6,951,596 B2 | 10/2005 | Green | |
| 7,025,259 B2 | 4/2006 | Mausy | |
| 7,037,556 B2 | 5/2006 | Jaynes | |
| 7,253,735 B2 * | 8/2007 | Gengel et al. | 340/572.7 |
| 7,342,490 B2 * | 3/2008 | Herrmann et al. | 340/572.7 |
| 2001/0002035 A1 | 5/2001 | Kayanakis | |
| 2001/0014377 A1 | 8/2001 | Babb et al. | |
| 2003/0136503 A1 | 7/2003 | Green et al. | |
| 2004/0040740 A1 | 3/2004 | Nakatani et al. | |
| 2004/0061994 A1 | 4/2004 | Kerr et al. | |
| 2004/0062016 A1 | 4/2004 | Kerr et al. | |
| 2004/0215350 A1 | 10/2004 | Roesner | |
| 2005/0035924 A1 | 2/2005 | Liu et al. | |
| 2005/0066513 A1 | 3/2005 | Kayanakis et al. | |
| 2005/0198811 A1 | 9/2005 | Kurz et al. | |
| 2005/0206524 A1 | 9/2005 | Forster et al. | |
| 2005/0275540 A1 | 12/2005 | Halope et al. | |
| 2005/0282495 A1 | 12/2005 | Forster | |
| 2006/0125641 A1 | 6/2006 | Forster | |
| 2006/0244603 A1 * | 11/2006 | Kline | 340/572.7 |
| 2006/0244662 A1 | 11/2006 | Bauer et al. | |
| 2006/0290498 A1 | 12/2006 | Rawlings et al. | |
| 2007/0040688 A1 * | 2/2007 | Cocita et al. | 340/572.7 |
| 2007/0056683 A1 * | 3/2007 | Manes et al. | 156/264 |
| 2007/0057796 A1 * | 3/2007 | Craig et al. | 340/572.7 |
| 2007/0085685 A1 * | 4/2007 | Phaneuf et al. | 340/572.8 |
| 2007/0089286 A1 * | 4/2007 | Cheng et al. | 29/601 |
| 2007/0188327 A1 * | 8/2007 | Keeton et al. | 340/572.7 |

FOREIGN PATENT DOCUMENTS

| | | |
|---|---|---|
| JP | 2003/288568 | 10/2003 |
| JP | 2004/118844 | 4/2004 |
| JP | 2006/059373 | 3/2006 |
| JP | 2006/127471 | 5/2006 |
| WO | WO 00/26856 | 5/2000 |
| WO | WO 2004/088582 | 10/2004 |
| WO | WO 2005/057483 | 6/2005 |

OTHER PUBLICATIONS

International Preliminary Report on Patentability (Chapter I of the PCT) issued in corresponding PCT/US2007/075961 dated Jun. 4, 2009.

U.S. Appl. No. 11/276,713, filed Mar. 10, 2006, Phaneuf et al.

* cited by examiner

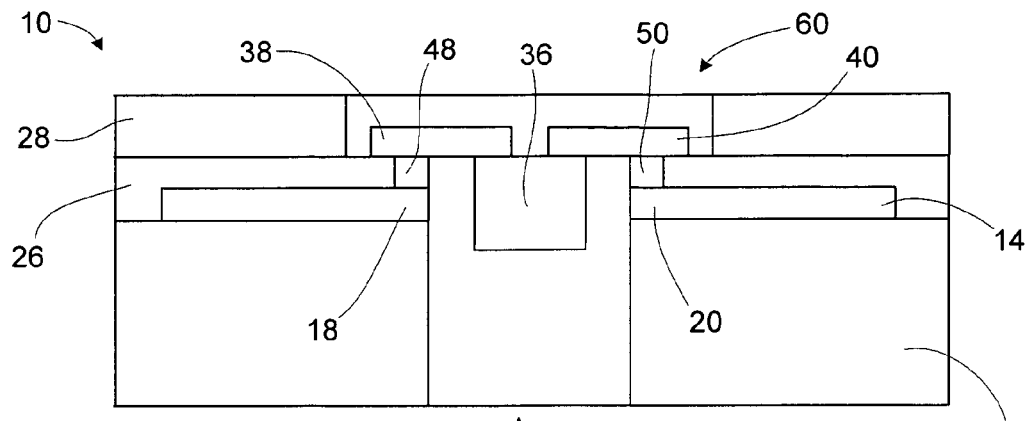
FIG. 2
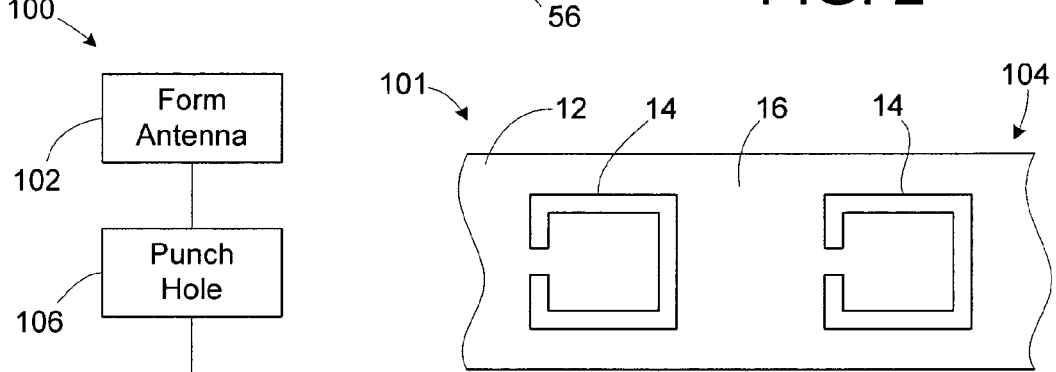
FIG. 4
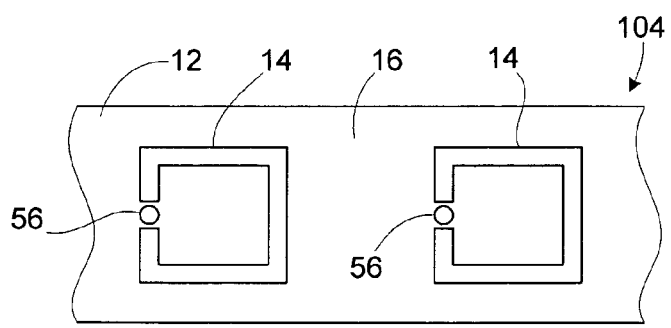
FIG. 5
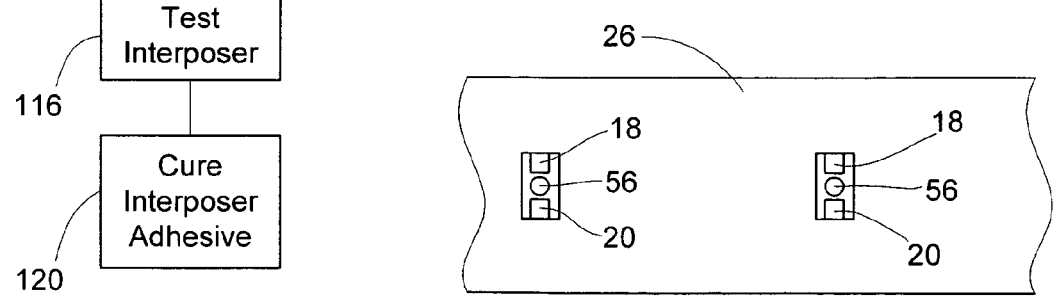
FIG. 6
FIG. 3

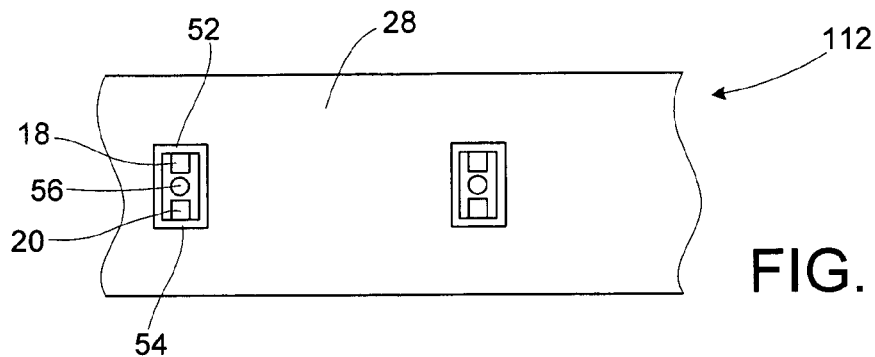
FIG. 7
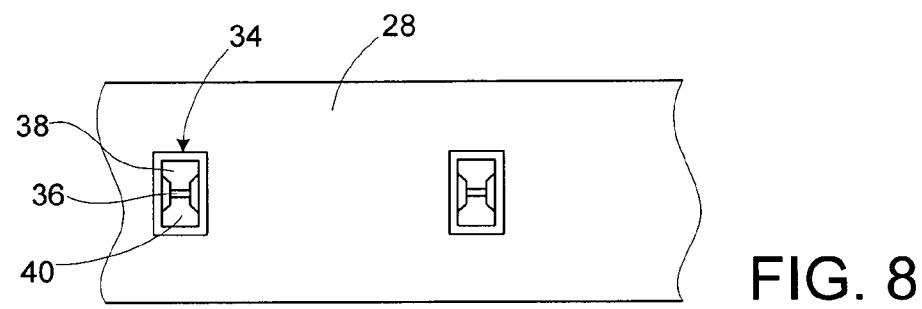
FIG. 8
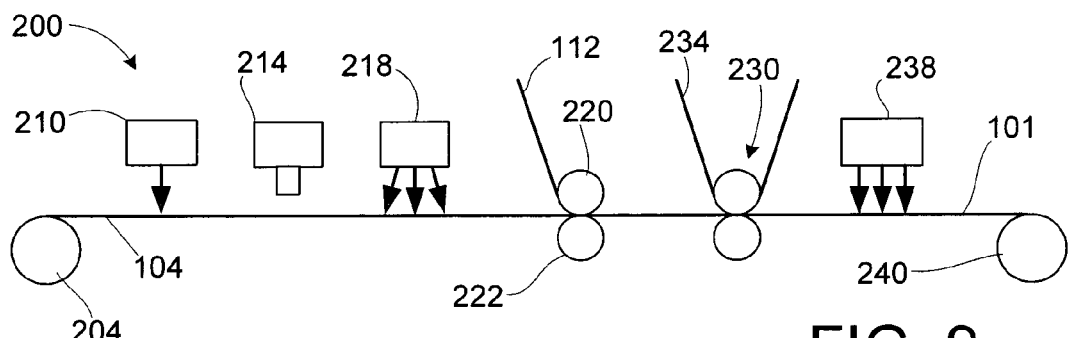
FIG. 9
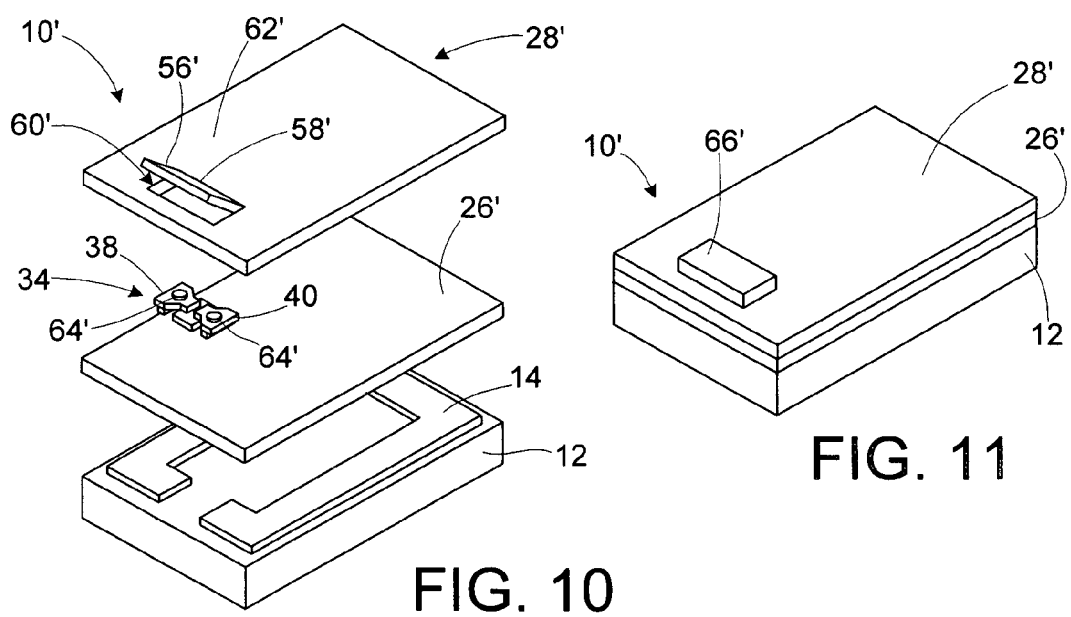
FIG. 10
FIG. 11

RFID LABEL WITH RELEASE LINER WINDOW, AND METHOD OF MAKING

BACKGROUND OF THE INVENTION

1. Field of the Invention

This invention relates to the field of radio frequency identification (RFID) devices, and methods of making RFID devices.

2. Description of the Related Art

Radio frequency identification (RFID) tags and labels (collectively referred to herein as "devices") are widely used to associate an object with an identification code. RFID devices generally have a combination of antennas and analog and/or digital electronics, which may include for example communications electronics, data memory, and control logic. For example, RFID tags are used in conjunction with security locks in cars, for access control to buildings, and for tracking inventory and parcels. Some examples of RFID tags and labels appear in U.S. Pat. Nos. 6,107,920, 6,206,292, and 6,262,692, all of which are hereby incorporated by reference in their entireties.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source, and passive tags and labels, which do not. In the case of passive tags, in order to retrieve the information from the chip, a "base station" or "reader" sends an excitation signal to the RFID tag or label. The excitation signal energizes the tag or label, and the RFID circuitry transmits the stored information back to the reader. The "reader" receives and decodes the information from the RFID tag. In general, RFID tags can retain and transmit enough information to uniquely identify individuals, packages, inventory and the like. RFID tags and labels also can be divided between those to which information is written only once (although the information may be read repeatedly), and those to which information may be written during use. For example, RFID tags may store environmental data (that may be detected by an associated sensor), logistical histories, state data, etc.

There is a continued desire for RFID devices that have improved performance, reduced size, and reduced cost. It will be appreciated that there is room for improving RFID devices in at least these areas.

SUMMARY OF THE INVENTION

According to an aspect of the invention, an RFID label includes an interposer that is coupled to an antenna by placing the interposer in an opening in a release liner.

According to another aspect of the invention, a method of making an RFID device includes coupling an interposer to an antenna through an opening in a release liner.

According to yet another aspect of the invention, a method of making an RFID label includes the steps of: forming an antenna on a substrate; applying a patterned adhesive over the antenna, wherein the applying leaves antenna end portions of the antenna uncovered by the adhesive; adhesively adhering a release liner to the patterned adhesive; and coupling an interposer to the antenna. The interposer includes a chip and conductive interposer leads coupled to the chip. The interposer is located within an opening in the release liner.

According to still another aspect of the invention, an RFID label includes: a substrate; an antenna on the substrate; a patterned adhesive overlying the antenna and the substrate, wherein the patterned adhesive includes an open area leaving at least parts of antenna ends of the antenna uncovered by adhesive; an interposer coupled to the antenna ends; and a release liner coupled to the patterned adhesive. The release liner has an opening therein in which the interposer is located.

According to a further aspect of the invention, a method of making an RFID label includes: forming an antenna on a substrate; applying an adhesive over at least part of the antenna; after applying the adhesive, coupling an interposer to the antenna, wherein the interposer includes a chip and conductive interposer leads coupled to the chip; and adhering a release liner to the adhesive.

According to a still further aspect of the invention, an RFID label includes: a substrate; an antenna on the substrate; an adhesive overlying at least part of the antenna and the substrate; an interposer coupled to antenna ends of the antenna; and a release liner adhered to the adhesive. The release liner has an opening therein in which the interposer is located.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 2 is a cross-sectional view of the RFID label of FIG. 1;

FIG. 3 is a high level flowchart of a method for making RFID labels in accordance with an embodiment of the present invention;

FIG. 4 is a plan view illustrating a first step in the method of FIG. 3;

FIG. 5 is a plan view illustrating a second step in the method of FIG. 3;

FIG. 6 is a plan view illustrating a third step in the method of FIG. 3;

FIG. 7 is a plan view illustrating a fourth step in the method of FIG. 3;

FIG. 8 is a plan view illustrating a fifth step in the method of FIG. 3;

FIG. 9 is a schematic view of an RFID label fabrication system for performing the method of FIG. 3;

FIG. 10 is an exploded view of an RFID label in accordance with another embodiment of the invention;

FIG. 11 is an oblique view of an RFID label in accordance with yet another embodiment of the invention;

DETAILED DESCRIPTION

An RFID label includes a release liner having an opening or window, to allow placement of an interposer through the window, and in contact with end portions of an antenna. By coupling the interposer to the antenna through the window in the release liner, the coupling may be performed at a later point than usual in the fabrication of the label. This allows the label to be fabricated with less wear and tear on the interposer, which is a relatively expensive and fragile part of the antenna. In addition, testing of the interposers before applying them to a web of labels may save costs by eliminating waste of material. Testing of the straps alone can allow prediction of performance of the finished label. By placing the interposers later in the process of forming the label, the machines utilized in the other steps, such as in the parts of a roll-to-roll process, may have greater tolerances for parameters such as electrostatic discharge, pressure control, and bend radius control. Reliability of the resulting labels may be improved, and the need for testing the completed labels may be reduced.

Figure 1:
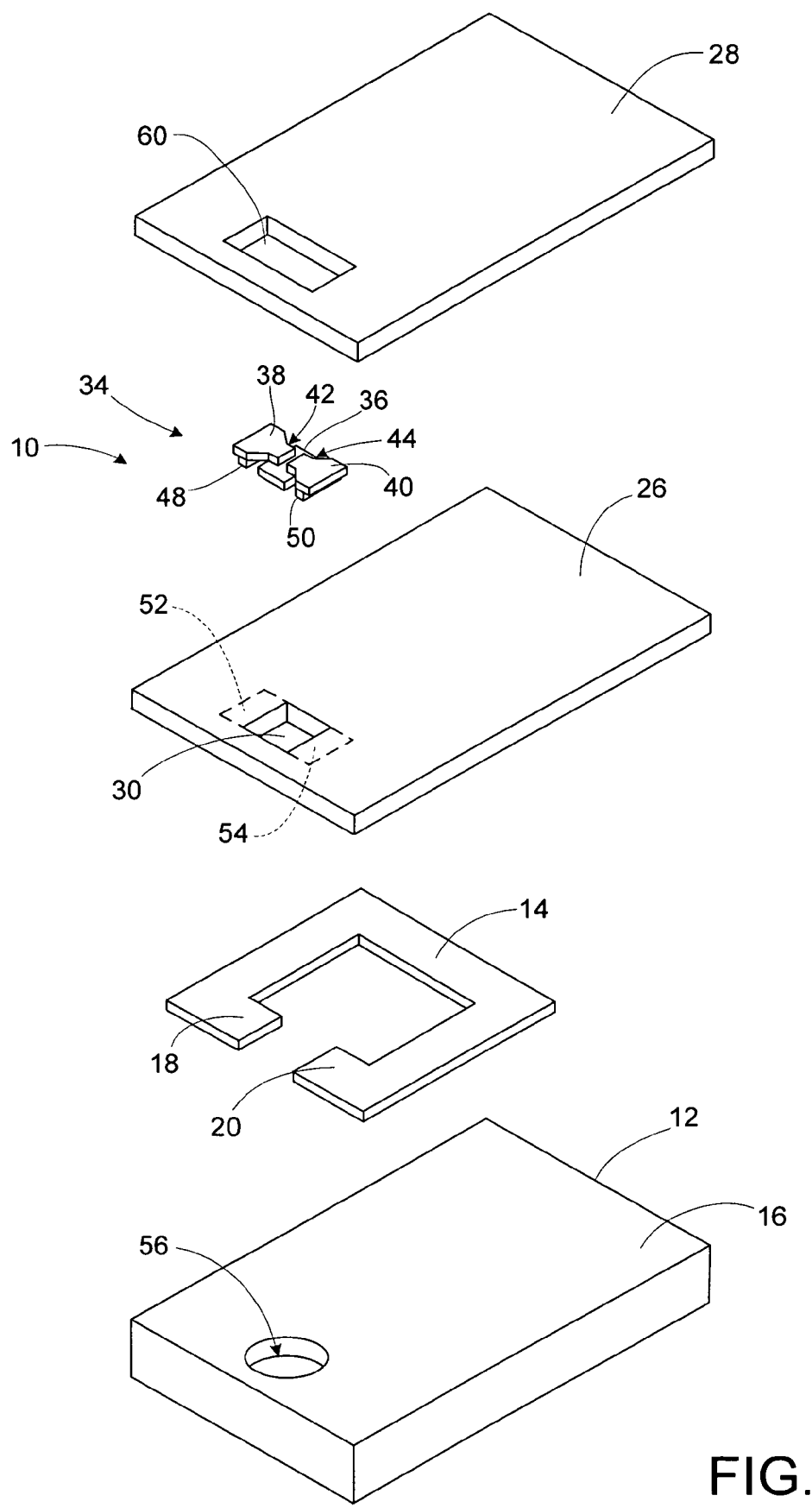
FIG. 1 is an exploded view of an RFID label in accordance with an embodiment of the present invention.

Referring initially to FIGS. 1 and 2, an RFID label 10 includes a substrate 12 upon which an antenna 14 is placed. The substrate 12 may include any of a variety of suitable materials, for example including, but not limited to, high Tg polycarbonate, poly(ethylene terephthalate), polyarylate, polysulfone, a norbornene copolymer, poly phenylsulfone, polyetherimide, polyethylenenaphthalate (PEN), polyethersulfone (PES), polycarbonate (PC), a phenolic resin, polyester, polyimide, polyetherester, polyetheramide, cellulose acetate, aliphatic polyurethanes, polyacrylonitrile, polytrifluoroethylenes, polyvinylidene fluorides, HDPEs, poly(methyl methacrylates), a cyclic or acyclic polyolefin, or paper. The substrate 12 may be a flexible material, suitable for labels.

The antenna 14 may be deposited or formed on a top surface 16 of the substrate 12 by any of a number of suitable methods. The antenna 14 may be made of any of a variety of suitable conductive materials, such as metals or conductive inks. Metal antennas, which may be made of metals such as copper, may be formed of suitable methods, such as by etching, stamping, or electroplating. Metal foil may be stamped or etched to form a suitable pattern for the antenna 14, and then may be attached to the substrate 12.

Suitable conductive inks for the antenna 14 may include any of a variety of suitable electrically conductive materials, including conductive metal particles, carbon particles, or conductive polymer particles. Examples of suitable conductive materials include copper particles, nickel particles, silver particles, aluminum particles, various metal alloy particles, carbon particles, and conductive polymer particles. Examples of conductive polymers include intrinsically conductive polymers such as polyethylenedioxythiophene (PEDOT), polypyrrole (PPy), or polyaniline (PANI).

The antenna 14 may be deposited or formed on the substrate surface 16 by methods such as printing or various physical and/or vapor deposition methods. Printing of the antenna 14 may be done by any of a variety of printing techniques, such as inkjet printing, gravere printing, offset printing, or other suitable patterned printing techniques. Deposition onto the substrate surface 16 may be done using a mask to block off parts of the substrate surface 16 where formation of the antenna 14 is not desired.

The antenna 14 has a pair of antenna ends 18 and 20 used for coupling an interposer to the antenna 14, as is described in greater detail below. It will be appreciated that the configuration of the antenna 14 is only one of a wide variety of possible antenna configurations for the RFID label 10. A wide variety of antenna configurations for various identification devices are widely known in the art.

A patterned adhesive layer 26 is located on and over most of the substrate 12 and the antenna 14. The main function of the adhesive layer 26 is eventually to secure the RFID label 10 to an object, such as a carton, to which it is applied. Before use, the adhesive layer 26 may be substantially covered by a release liner 28. The adhesive layer 26 has an open area 30 between the antenna ends 18 and 20. The adhesive layer 26 may include any of a wide variety of suitable adhesives, such as suitable pressure sensitive adhesives. The adhesive layer 26 surrounds an open area 30 between the antenna ends 18 and 20. Also, the open area 30 may leave parts of the antenna ends 18 and 20 uncovered by adhesive.

The adhesive layer 26 is topped by the release liner 28 and an interposer 34. An interposer (also known as a strap) is defined herein as a combination of a chip (including an integrated circuit) and conductive leads used to provide an increased surface area (footprint) for electrically coupling the chip to an antenna. An interposer includes any of a variety of combinations of wireless communication devices (RFID chips) with conductive leads coupled thereto to facilitate electrical connection of the chips to antennas. An interposer may optionally include additional parts, such as an interposer substrate supporting the interposer leads and/or the chip. Examples of suitable RFID interposers include an RFID interposer available from Alien Technologies, and the interposer marketed under the name I-CONNECT, available from Philips Electronics. Chips available from Philips Electronics or another supplier, such as Impinj of Seattle, Wash., may be attached either conductively, in a flip-chip die, or conductively or reactively for an interposer form of the chip. Suitable RFID chips include the Philips HSL chip, available from Philips Electronics, and the EM Marin EM4222, available from EM Microelectronic-Marin SA.

The interposer 34 includes a chip 36 and a pair of interposer conductive leads 38 and 40. The interposer conductive leads 38 and 40 are conductive material portions that provide increased surface area for facilitating connection of the interposer 34 to the antenna 14. The interposer leads 38 and 40 are electrically coupled to respective chip contacts 42 and 44 of the interposer chip 36.

The interposer leads 38 and 40 have interposer lead adhesive pads 48 and 50 on their undersides, the sides of the interposer leads 38 and 40 facing the antenna 14. The interposer lead adhesive pads 48 and 50 are used to mechanically and electrically couple the interposer leads 38 and 40 to the antenna ends 18 and 20. The interposer lead adhesive pads 48 and 50 may be pads of a suitable conductive adhesive, such as of a suitable isotropic conductive paste. Such a conductive adhesive provides a direct ohmic electrical connection between the interposer leads 38 and 40, and the antenna ends 18 and 20. Alternatively, the interposer adhesive pads 48 and 50 may be non-conductive, with capacitive, magnetic, or other types of indirect (reactive) electrical coupling used to couple together the antenna ends 18 and 20, and the interposer leads 38 and 40.

As illustrated best in FIG. 2, the interposer 34 is secured to the antenna 14 and the substrate 12 through use of both the interposer lead adhesive pads 48 and 50, and exposed portions 52 and 54 of the adhesive layer 26. Thus both conductive and non-conductive adhesives may be used for securing the interposer 34.

The interposer 34 may be secured to the antenna 14 and the substrate 12 in a chip-down (flip chip) configuration. In this configuration the chip contacts 42 and 44 of the interposer chip 36 are facing away from the substrate 12. In such a configuration the interposer leads 38 and 40 are also farther away from the substrate 12 than most or all of the interposer chip 36. The substrate 12 may include a recess or hole 56 for receiving therein part of the chip 36. The recess or hole 56 may be round, or may have other suitable shapes. The hole 56 may be suitably formed in the substrate 12 by use of a punch. It will be appreciated that a variety of other configurations and/or formation methods may be used to produce the recess or hole 56. It will also be appreciated that the interposer 34 may be placed in a chip-up configuration, with the chip contacts 42 and 44 facing toward the substrate 12.

The release liner 28 has a window 60, an opening or hole all the way through the release liner 28. The window 60 is sized so that the interposer 34 fits fully through the window. As explained in greater detail below, the RFID label 10 is manufactured so that the release liner 28 is placed on the adhesive layer 26 before the interposer 34 is coupled to the rest of the label 10. The window 60 may be configured to be larger than the open area 30 in the adhesive layer 26. This leaves the exposed portions 52 and 54 of the adhesive layer 26 accessible through the window 60, even after the release liner 28 is applied to the adhesive layer 26.

The release liner 28 may be made of any of a variety of suitable materials. For example, the release liner 28 may be a suitable silicone-coated polymer or paper material that may be pulled off to reveal the underlying adhesive layer 26.

FIG. 3 illustrates a high-level flowchart of a method 100 for producing a roll or web 101 of the RFID labels 10. FIGS. 4-8 illustrate various steps of the method 100. The steps are described in terms of a roll-to-roll process for making the roll or web containing a multitude of the RFID labels 10. It will be appreciated that the method 100 may also be performed as multiple roll-to-roll operations, and/or that some or all of the steps may be performed in other than roll-to-roll operations.

In step 102 of the method 100, illustrated in FIG. 4, the antenna 14 is formed on the surface 16 of the substrate 12, which is part of a substrate web 104. As discussed earlier, the antenna 14 may be printed or otherwise deposited onto the substrate 12.

The hole 56 is punched in the substrate 12 in step 106 of the method 100, shown in FIG. 5. One way of forming the hole 56 is to punch it out of the substrate 12 at the appropriate location, such as between the antenna ends 18 and 20 of the antenna 14. It will be appreciated that a wide variety of other suitable methods may be used to produce the hole 56, or to produce a recess at the same location. It will be appreciated that step 106 may be omitted entirely, or may be performed in a different order than what is shown in FIG. 3 and what is described herein.

The patterned adhesive layer 26 is applied in step 108 of the method 100. This is illustrated in FIG. 6. As discussed above, the patterned adhesive layer 26 may be applied using any of a variety of suitable printing or deposition methods. The open area 30 in the adhesive layer 26 leaves the hole or recess 54 and parts of the antenna ends 18 and 20 uncovered by the adhesive layer 26.

In step 110 the release liner 28 is applied onto the adhesive layer 26. The windows 60 in the release liner 28 may have been formed previously, by such processes as punching or die cutting. The release liner 28 may be part of a web 112 of continuous release liner material, as is illustrated in FIG. 7. The joining together of the release liner web 112 with the substrate web 104 may be done from a pair of supply rolls of the two materials, with joining being performed between suitable rollers that press the release liner 28 onto the adhesive layer 26. The release liner web 112 may be suitably aligned with the substrate web 104 so as to place the windows 60 in desired locations relative to the open areas 30 and/or the holes or recesses 54. Optically-detectable alignment marks or other suitable alignment methods may be used to achieve the proper alignment. As was described earlier, the window 60 may be placed so as to overlie the open area 30 within the adhesive layer 26, as well as leaving uncovered the exposed portions 48 and 50 of the adhesive layer 26.

Steps 114 and 116 of the method 100 involve preparation of the interposer 34, prior to coupling the interposer 34 to the rest of the RFID label 10. In step 114 performance of the interposer 34 is tested. This testing may be performed by any of a variety of suitable short-range testing methods. Further details regarding examples of testing methods may be found in commonly-owned U.S. patent application Ser. No. 10/367, 515 (filed Feb. 13, 2003), Ser. No. 10/805,938 (filed Mar. 22, 2004) and Ser. No. 11/359,669 (filed Feb. 22, 2006). The figures and descriptions of all of these are herein incorporated by reference. In step 116 the interposer lead adhesive pads 48 and 50 are applied onto the interposer leads 38 and 40. This deposition may be by any of a variety of suitable methods, such as printing or spraying.

In step 120, illustrated in FIG. 8, the interposers 34 are placed into the window 60 in the release liner 28, to mechanically and electrically couple to the antennas 14. It will be appreciated that a wide variety of methods and machines are available in the prior art to perform the process of placing the interposers 34 at a desired pitch along the substrate web 104. Pick and place devices, and devices for placing using rolls or webs of interposers, with or without singulation, are examples of suitable ways of accomplishing the placement of the interposers 34. Examples of such devices may be found in commonly-owned U.S. Pat. No. 6,951,596 and U.S. patent application Ser. No. 10/947,010, filed Sep. 22, 2004. The figures and descriptions of both of these are herein incorporated by reference.

Finally, in step 122 of the method 100, the interposer lead adhesive pads 48 and 50 are cured to make a secure bond between the interposer 34, and the antenna 14 and the substrate 12. It will be appreciated that the exposed portions 48 and 50 of the adhesive layer 26 aid in holding the interposer 34 in place prior to the curing operation. Curing may be by any of a variety of curing methods, such as heating or exposure to ultraviolet light.

The resulting RFID label web 101 may be stored in roll form. The RFID labels 10 may be singulated from the web at a later time. After being singulated, the RFID labels 10 may be suitably applied to devices, for instance to track inventory.

The method of making the RFID labels 10 described above offers several advantages over prior methods. Delaying the coupling of the interposer 34 to the antenna 14 until rather late in the fabrication process reduces the wear and tear on the interposer 34, and on the coupling between the interposer 34 and the antenna 14. This improves reliability of the resulting RFID label 10, as well as reducing the risk of label failure during fabrication.

In addition, placement of the interposer 34 within the window 60 in the release liner 28 decreases thickness of the RFID label 10. Location of all or a part of the interposer chip 36 within the recess of the hole 56 may further serve to reduce thickness of the resulting RFID label 10. The overall thickness of the RFID label 10 may be unaffected by the presence of the interposer 34. If the interposer 34 is thin enough so that it does not protrude above the release liner 28, the release liner 28 becomes the determiner for overall thickness of the RFID label 10.

FIG. 9 shows a schematic diagram of a fabrication system 200 for making a web 101 of the RFID labels 10. A substrate supply roll 204 supplies a substrate web 104. An antenna printer 210 applies antennas 14 (FIG. 1) to the substrate web 104. A punch 214 is then used to put the holes 54 (FIG. 1) in the substrate web 104. An adhesive printer 218 is then used to put down the patterned adhesive layer 26 (FIG. 1).

Rollers 220 and 222 join a release liner web 112 to the substrate web 104. An interposer applier 230 applies the interposers 34 (FIG. 1), coupling the interposers 34 to the antennas 14. The interposers 34 may be applied from an interposer web 234. The application of the interposers 34 may be at the same pitch as the antennas 14, or may be at a different pitch. Further details regarding attachment of interposers may be found in U.S. Pat. No. 6,951,596. Finally, curing of the adhesive is done at a cure station 238. The RFID label web 101 is then taken up at a take-up reel 240.

What follows are several alternative embodiments varying in some ways from what has been described heretofore. It will be appreciated that these embodiments may share several features with other embodiments described herein, and that discussion of these similar features may be abbreviated or omitted entirely in the description of these embodiments below. In addition, it will be appreciated that different features of different embodiments may be combined where appropriate. Further, when multiple features are described with regard to a single embodiment, it will be appreciated that some of these features may be omitted, where appropriate and if desired.

FIG. 10 shows an alternate RFID label 10' that has a substrate 12, an antenna 14, and an interposer 34, all similar to those of the RFID label 10 (FIG. 1) described above. The RFID label 10' has an adhesive layer 26' that is an unpatterned layer fully covering the substrate 12, in contrast to the patterned adhesive layer 26 (FIG. 1). The unpatterned adhesive layer 26' may have a substantially uniform thickness, and may be of a suitable non-conductive adhesive, such as a non-conductive pressure sensitive adhesive.

The interposer conductive leads 38 and 40 are coupled to the antenna 14 by reactive coupling. Reactive coupling is used here to refer broadly to non-contact electrical coupling that primarily couples the conductive leads 38 and 40 to the antenna 14, in contrast to the direct conductive (ohmic) coupling that couples together the conductive leads 38 and 40 to the antenna 14 in the RFID label 10 (FIG. 1). Reactive coupling, as the term is used herein, includes both magnetic coupling and capacitive coupling. References herein to magnetic, capacitive, or reactive coupling refer to coupling that is predominantly or primarily magnetic, capacitive, or reactive. It will be appreciated that coupling that is primarily magnetic may also include some capacitive coupling. Conversely, coupling that is primarily capacitive may also include some inductive (magnetic) coupling as a secondary coupling mechanism. Systems using primarily capacitive or magnetic coupling are referred to herein as utilizing reactive coupling. Capacitive, magnetic, or reactive coupling, as the terms are used herein, may also include some direct conductive coupling, albeit not as the primary type of electrical coupling.

The use of reactive coupling simplifies the adhesive application and reduces cost. The adhesive layer 26' may be easily applied by spraying or other suitable methods, without a need for patterning, in a single application step. Non-conductive adhesives are generally less expensive than conductive adhesive, so dispensing with use of a conductive adhesive reduces cost in comparison with the RFID label 10 (FIG. 1), which uses conductive adhesive in the interposer lead adhesive pads 48 and 50 (FIG. 1).

The RFID label 10' has a release liner 28' that includes a hinged flap 56' that covers a window or temporary aperture 60' in the release liner 28'. The flap 56' may be a section of the release liner 28' that is cut on three sides, allowing it to bend at a crease 58'. The hinged flap 56' may be opened to allow access to the underlying window 60' to allow placement of the interposer 34 through the window 60', onto the adhesive layer 26'. After the interposer 34 has been placed, the flap 56' may be closed, covering and protecting the interposer 34. The closed flap 56' may be adhered to the adhesive layer 26'.

It will be appreciated that suitable adhesives may be used in the adhesive layer 26' to allow opening of the flap 56', and subsequent closing and adhering of the flap 56'. As an alternative, the release liner 28' may be initially coupled to the adhesive layer 26' with the flap 56' in an initially open configuration, perhaps temporarily secured to a top surface 62' of the release liner 26' with a small amount of adhesive.

A back side of the interposer 34, opposite the side attached to the antenna 14 and the substrate 12, optionally has a high-strength pressure sensitive adhesive 64' thereupon. The high-strength adhesive 64' is a stronger adhesive than the adhesive layer 26'. The adhesive layer 26' may be a low grip, easily removed adhesive. After the release liner 28' is removed, and the RFID label 10' is adhered to an object, the interposer 34 may adhere to the object more strongly than the rest of the label 10'. This is due to the presence of the high-strength pressure sensitive adhesive 64'. When the label 10' is peeled off of or otherwise removed from an object, the interposer 34 may remain attached to the object. The interposer 34 that remains on the object may function as a near-field-detectable RFID device, that may be detectable at short range, but not at longer ranges. This protects consumer privacy while still allowing identification by detection of a portion of the device, the interposer 34. Further details regarding use of an interposer as a near-field-detectable RFID device may be found in U.S. patent application Ser. No. 10/886,831, filed Jul. 7, 2004, the description and drawings of which are herein incorporated by reference.

An alternative to the flap 56' is shown in FIG. 11, wherein the window 60' is covered by a separate piece, a window covering 66', after placement of the interposer 34. The covering 66' may be made of the same material as the release liner 28', or be made of a different material. The covering 66' performs the same function as the flap 56', covering and protecting the underlying interposer 34.

It will be appreciated that the use of reactive coupling across the adhesive layer 26' is a separate concept from the use of the flap 56' or the covering 66' to cover the window 60'. These separate concepts may be utilized individually, or they may be combined in the same RFID label 10', as is illustrated in FIGS. 10 and 11.

Figure 12:
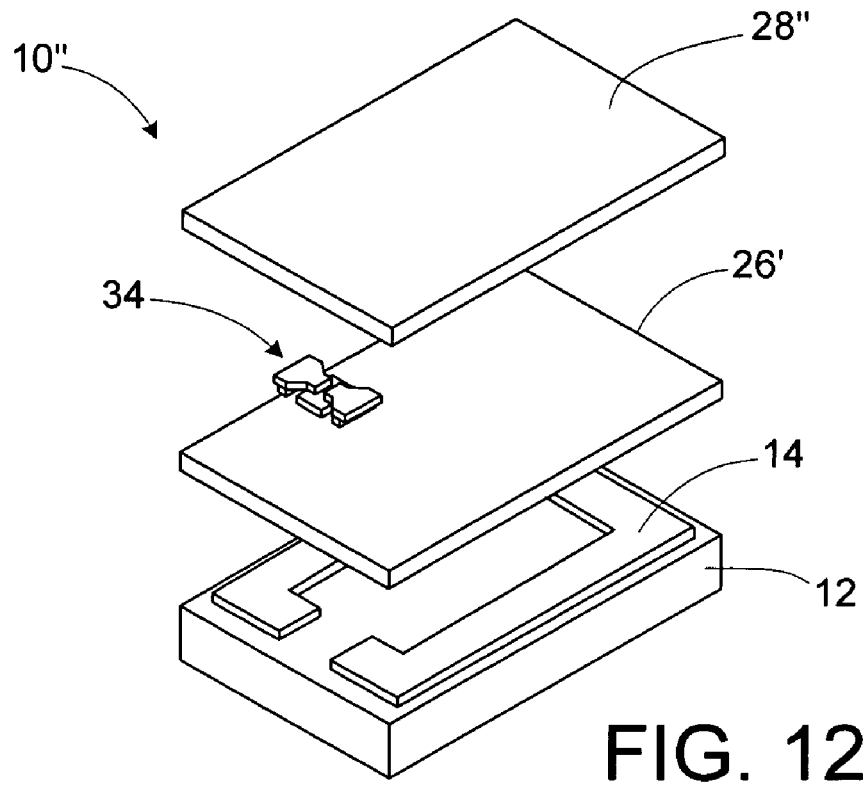
FIG. 12 is an exploded view of an RFID label in accordance with still another embodiment of the invention.

FIG. 12 shows an RFID label 10" of an alternate design, having a release liner 28" that does not have any sort of opening. The release liner 28" covers the interposer 34 in order to protect the interposer 34. According to one embodiment, the interposer 34 is adhered to the adhesive layer 26' immediately before the release liner 28" is placed on the adhesive layer 26'. According to another embodiment, the release liner 28" is initially placed on the adhesive layer 26', before placement of the interposer 34. The part of the release liner 28" is partially or fully peeled away or otherwise separated from the adhesive layer 26', to allow placement of the interposer 34. The release liner 28" is then placed back into contact with the adhesive layer 26', covering the interposer 34.

The RFID label 10" is shown in FIG. 12 using the non-conductive adhesive layer 26' that fully covers the antenna 14 and the substrate 12. It will be appreciated that the windowless release liner 28" also may be used with the adhesive and connection configuration shown in FIG. 1, which includes a patterned adhesive layer 26 and interposer lead adhesive pads 48 and 50 to mechanically and electrically couple the interposer 34 to the substrate 12 and the antenna 14.

Figure 13:
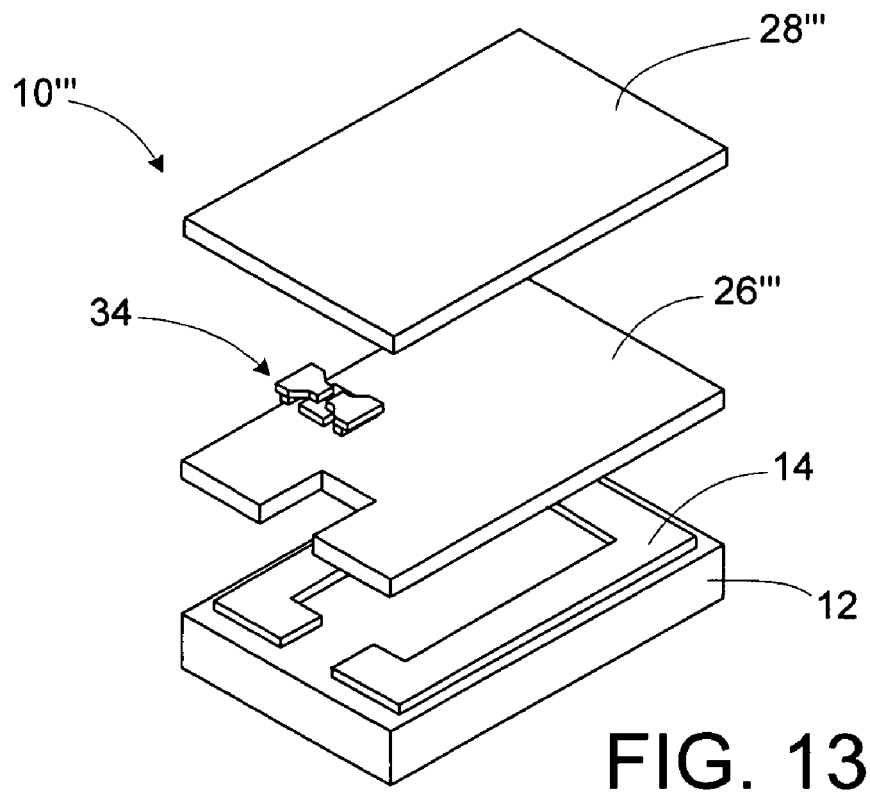
FIG. 13 is an exploded view of an RFID label in accordance with a further embodiment of the invention.

FIG. 13 shows a further embodiment, an RFID label 10''' with a patterned conductive adhesive layer 26'''. The conductive adhesive layer 26''' may be used to both electrically couple an interposer 34 to an antenna 14, and to adhere a release liner 28" to the antenna 14 and a substrate 12. The conductive adhesive of the conductive adhesive layer 26''' may be any of a variety of suitable conductive adhesives, for example the adhesives discussed above with regard the interposer lead adhesive pads 48 and 50 (FIG. 1).

The conductive adhesive layer 26''' may have any of a variety of suitable patterns. It may closely follow the pattern of the antenna 14. Alternatively, the conductive adhesive layer 26''' may cover nearly all of the substrate 12, leaving only an open area 30''' for the placement of the interposer 34.

Parts of the conductive adhesive layer 26''' may be used to electrically couple the interposer 34 to the antenna 14, and to mechanically couple the interposer 34 to the antenna 14 and the substrate 12. Alternatively one or both of these functions may be performed by suitable conductive or non-conductive adhesive on parts of the interposer 34. For example interposer lead adhesive pads 48 and 50 may be used to couple interposer leads 38 and 40 to the antenna 14.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of making an REID label, the method comprising:
    forming an antenna on a substrate;
    applying an adhesive over at least part of the antenna;
    after applying the adhesive, coupling an interposer to the antenna, wherein the interposer includes a chip and conductive interposer leads coupled to the chip;
    testing performance of the interposer before coupling the interposer to the antenna; and
    adhering a release liner to the adhesive.

2. The method of claim 1,
    wherein the interposer is coupled to the antenna after the release liner is adhered to the adhesive;
    wherein the coupling the interposer to the antenna includes placing the interposer in an opening of the release liner; and
    further comprising, after the coupling, covering the interposer with a flap of the release liner.

3. The method of claim 1,
    wherein the interposer is coupled to the antenna after the release liner is adhered to the adhesive;
    wherein the coupling the interposer to the antenna includes placing the interposer in an opening of the release liner; and
    further comprising, after the coupling, covering the interposer with a cover.

4. The method of claim 1,
    wherein the interposer is coupled to the antenna after the release liner is adhered to the adhesive;
    wherein the coupling is preceded by partially peeling away the release liner to allow placement of the interposer; and
    wherein the coupling is followed by re-adhering the release liner to the adhesive, thereby covering the interposer with the release liner.

5. The method of claim 1, wherein the coupling includes reactive coupling between the interposer leads and the antenna ends.

6. The method of claim 5,
    wherein the adhesive is non-conductive adhesive layer covering substantially all of the antenna; and
    wherein the reactive coupling is across the non-conductive adhesive layer.

7. The method of claim 1,
    wherein the adhesive is a patterned conductive adhesive; and
    wherein the adhering the release liner includes adhering with the conductive adhesive.

8. The method of claim 1,
    wherein the adhesive is a patterned adhesive layer that leaves antenna ends of the antenna uncovered; and
    wherein the coupling the interposer to the antenna includes using an electrically-conductive adhesive to connect the interposer leads to the antenna ends.

9. The method of claim 8,
    wherein the interposer is coupled to the antenna after the release liner is adhered to the adhesive;
    wherein the adhering the release liner includes leaving at least some of the patterned adhesive layer uncovered; and
    wherein the coupling the interposer to the antenna also includes using the uncovered adhesive to adhere to the interposer to at least one of the antenna or the substrate.

10. The method of claim 8, wherein the conductive adhesive includes an isotropic conductive paste.

11. The method of claim 1, wherein the coupling of the interposer to the antenna includes chip-down coupling.

12. The method of claim 11, wherein the interposer has a high-strength adhesive, stronger than the adhesive on the at least part of the antenna, on a back side of the interposer that is away from the antenna and the substrate.

13. The method of claim 12, wherein the interposer has a lower profile on the substrate than does the release liner.

14. The method of claim 11, wherein the chip-down coupling includes placing at least pan of the chip into a recess or hole in the substrate.

15. The method of claim 14,
    wherein the recess or hole is a hole; and
    further comprising punching the hole in the substrate.

16. The method of claim 1, wherein the steps of the method are pans of a roll-to-roll process.

17. An RFID label comprising:
    a substrate;
    an antenna on the substrate;

a patterned adhesive overlying at least pan of the antenna and the substrate wherein the patterned adhesive has an open area leaving at least pans of the antenna ends uncovered by adhesive;

an interposer coupled to antenna ends of the antenna and the interposer is also adhesively coupled to pans of the patterned adhesive;

a release liner adhered to the adhesive;

a conductive adhesive that couples interposer leads of the interposer to the antenna ends;

wherein the release liner has an opening therein in which the interposer is located and the release liner opening is larger than the patterned adhesive open area.

18. The RFID label of claim 17, wherein the release liner opening circumscribes the patterned adhesive open area.

19. The RFID label of claim 17, wherein the conductive adhesive includes an isotropic conductive paste.

20. An RFID label, comprising:
a substrate;
an antenna on the substrate the antenna having antenna ends;
an adhesive overlying at least part of the antenna and the substrate, the adhesive having an opening over the antenna ends;
an interposer coupled to antenna ends of the antenna; and
a release liner adhered to the adhesive;
wherein the release liner has an opening therein in which the interposer is located and the opening in the release liner is larger than the opening in the adhesive; and
wherein the interposer has interposer leads that are reactively coupled to the antenna ends.

21. A method of making an REID label, the method comprising:
forming an antenna on a substrate;
applying an adhesive over at least part of the antenna and the adhesive is a patterned adhesive layer that leaves antenna ends of the antenna uncovered;
after applying the adhesive, coupling an interposer to the antenna, wherein the interposer includes a chip and conductive interposer leads coupled to the chip and the coupling the interposer to the antenna includes reactive coupling between the interposer leads and the antenna ends; and
adhering a release liner to the adhesive.

22. The method of claim 21 further comprising testing performance of the interposer before coupling the interposer to the antenna.

23. The method of claim 22, wherein the testing performance of the interposer substitutes for testing of the RFID label.

* * * * *